United States Patent [19]
Coates

[11] Patent Number: 6,008,710
[45] Date of Patent: Dec. 28, 1999

[54] MAGNETIC INDUCTOR WATER CONDITIONER

[76] Inventor: George J. Coates, Rte. 37 & Ridgewood Rd., Wall Township, N.J. 07719

[21] Appl. No.: 09/313,328

[22] Filed: May 17, 1999

[51] Int. Cl.$^6$ .................................................. B01D 36/06
[52] U.S. Cl. ........................ 335/296; 335/303; 335/306; 210/222
[58] Field of Search .................... 335/302–306, 335/296–298; 210/222, 223; 123/538

[56] References Cited

U.S. PATENT DOCUMENTS

Re. 35,689  12/1997  Kulish ..................................... 210/222
3,971,965   7/1976   Baker et al. .............................. 315/3.5
5,334,910   8/1994   Karsten et al. .......................... 315/5.35

*Primary Examiner*—Michael L. Gellner
*Assistant Examiner*—Raymond Barrera
*Attorney, Agent, or Firm*—Clifford G. Frayne

[57] ABSTRACT

A magnetic inductor for inducing a magnetic field and electromagnetic effects upon water passing through a conduit, the magnetic inductor having two semi-cylindrical halves, each half having a longitudinal channel such that when the two semi-cylindrical halves are juxtaposed, there is defined a throughbore for receipt of a water conduit, each semi-cylindrical half having a plurality of semi-annular permanent magnets positioned therein such that they form an annular ring permanent magnet when the two semi-cylindrical halves are juxtaposed about a water conduit.

4 Claims, 2 Drawing Sheets

MAGNETIC INDUCTOR WATER CONDITIONER

BACKGROUND OF THE INVENTION

1. Field of the Invention

A magnetic inductor having a plurality of semi-annular shaped permanent magnets positioned within a cylindrical housing formed of two semi-cylindrical halves defining a throughbore through said magnets and housing for wrapped engagement about a standard sized water pipe.

2. Description of the Prior Art

Water is a highly sensitive receptor to electromagnetic disturbances of long wavelengths such as that induced by permanent magnets. Attempts have been made to recover or increase the beneficial properties of natural water as far as possible by passing water through strong magnetic or electromagnetic fields or by submitting it to electrostatic discharges. Water thus treated offers a series of beneficial effects to living creatures, animal and vegetable, having a regenerating effect on cell structure. A magnetic field is responsible for inducing long waves that are absorbed by the molecular structure of water running through the field. Water submitted to this magnetic treatment appears to be very useful for human consumption and has no side effects, but rather, it is notable as a diuretic, disintoxicating agent, and offers some benefits for arthritic and rheumatic states.

While not all the benefits of subjecting water to a magnetic field have been accurately, scientifically documented, what has been documented is that the subjection of water to a magnetic field does provide some therapeutic properties without any known side affects. It is therefore of interest to provide for a magnetic inductor which is portable, and easily adaptable to existing plumbing systems such that it can be installed without extensive plumbing alterations.

The present invention is directed to such a magnetic inductor which is designed to be removably secured about an existing copper or metal water pipe as might be found under the sink or as part of the spigot for the sink.

OBJECTS OF THE INVENTION

An object of the present invention is to provide for a novel magnetic inductor for a water pipe which can be positioned about the water pipe with no plumbing alterations.

Another object of the present invention is to provide for a novel magnetic inductor which when positioned about a water pipe will subject the water passing through the water pipe to a magnetic field.

A still further object of the present invention is to provide for a novel magnetic inductor which may be relocated easily from one sink to another sink.

A still further object of the present invention is to provide for a novel magnetic inductor in which the permanent magnets are positioned in a housing in a semi-donut configuration, but are donut-shaped in configuration when the housing is positioned in wrapped fashion about the water pipe.

SUMMARY OF THE INVENTION

A magnetic inductor for inducing a magnetic field and electro-magnetic effects upon water passing through a pipe, the magnetic inductor having a cylindrically-shaped housing and centrally disposed throughbore formed of two semi-cylindrical halves, there being positioned within each semi-cylindrical halve, a plurality of permanent magnets of semi-annular shape such that when semi-cylindrical halves are positioned in alignment about a water pipe passing through the throughbore defined by the housing, the permanent magnets of the respective semi-cylindrical halves combine to form an annular-shape imparting an electromagnetic field effecting the water passing through the pipe.

BRIEF DESCRIPTION OF THE DRAWINGS

These and other objects of the present invention will become evident, particularly when taken in light of the following illustrations wherein.

DETAILED DESCRIPTION OF THE DRAWINGS

Figure 1:
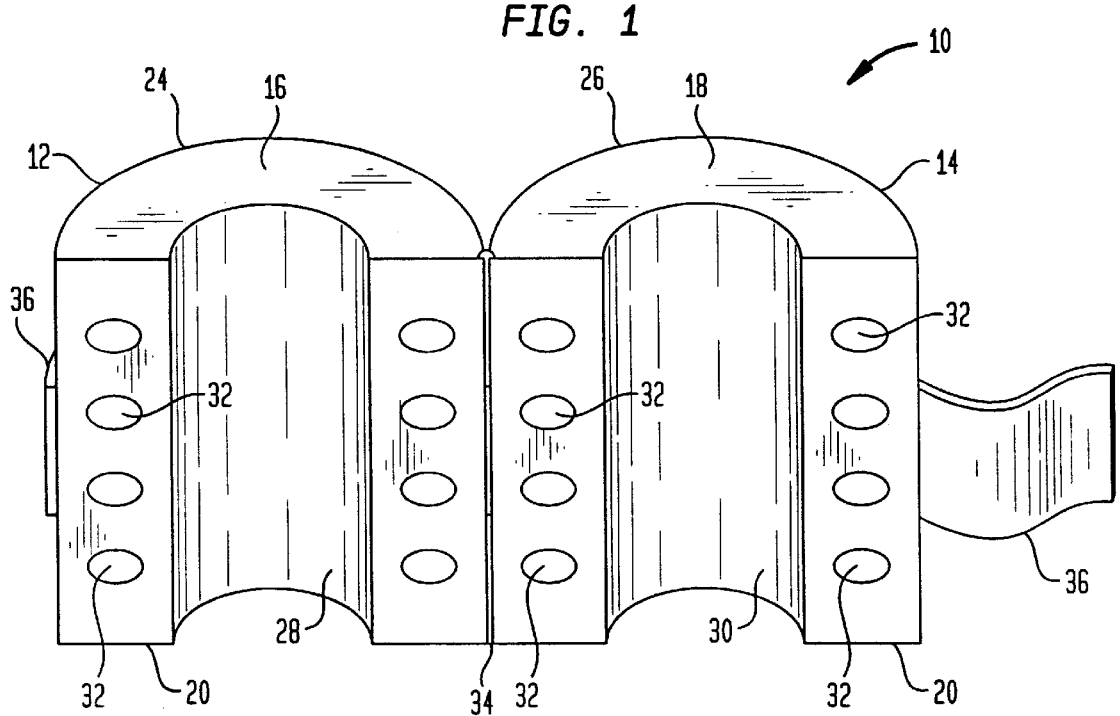
FIG. 1 is an open perspective view of the magnetic inductor.

FIG. 1 is a front prospective view of an open magnetic inductor 10 of the present invention. Magnetic inductor 10 is comprised of two semi-cylindrical body members 12 and 14 each having an upper surface 16 and 18 respectively and a lower surface 20 and 22 respectively and an outer semi-cylindrical surface 24 and 26 respectively. There is centrally formed in each semi-cylindrical housing member of 14 and 16, between upper surface and lower surface 16 and 20 and 18 and 22, a semi-cylindrical throughbore 28 and 30 such that when semi-cylindrical housing members 12 and 14 are mated together to form a cylindrical housing member 15, semi-cylindrical throughbores 28 and 30 form a cylindrical throughbore between upper ends 16 and 18 respectively and lower ends 20 and 22 respectively.

Semi-cylindrical housing members 12 and 14 may be formed of any suitable polymer or plastic, preferably a thermaset elasatomer. Positioned within semi-cylindrical housing members 12 and 14 are a plurality of permanent magnet members 32. Magnet members 32 are semi-annular as mounted in body members 12 and 14 and are in parallel stacked relationship with adjacent magnet members 32 in the respective housings 12 and 14. When semi-cylindrical housing members 12 and 14 are mated together to form cylindrical housing member 15, the magnet members 32 in each of semi-cylindrical housing members 12 and 14 are in alignment to form an annular-shaped magnet member. See FIG. 4.

Figure 2:
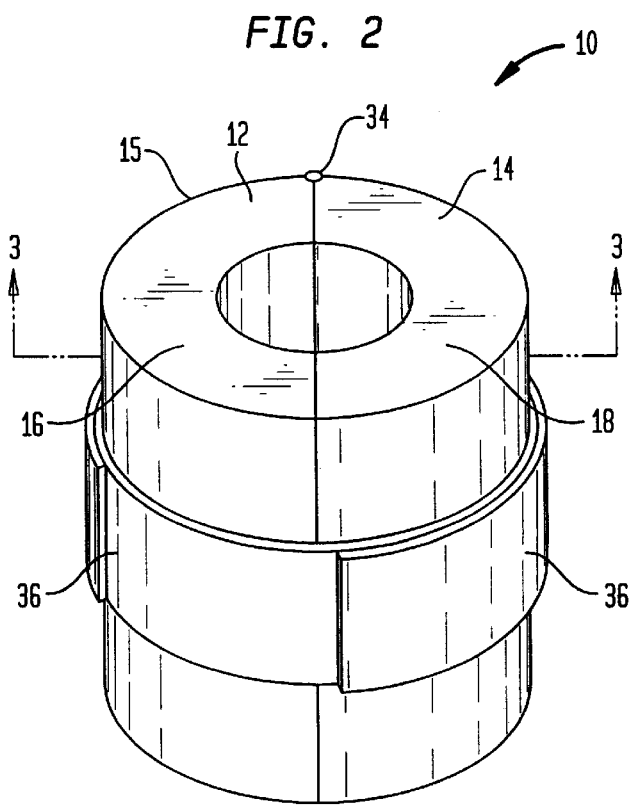
FIG. 2 is a closed perspective view of the magnetic inductor.
Figure 3:
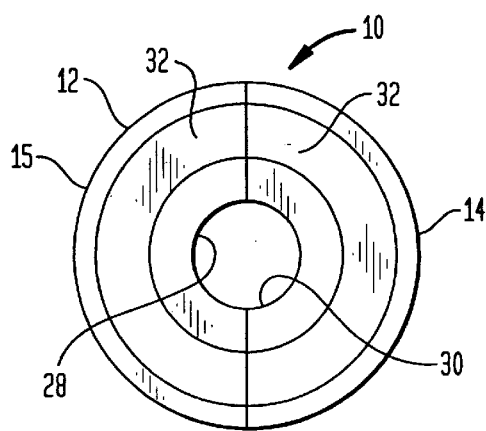
FIG. 3 is a top view of the magnetic inductor along plane 3—3 of FIG. 2.

FIG. 2 is a prospective view of magnetic inductor 10 in a closed position wherein semi-cylindrical housing members 12 and 14 have been mated together to form cylindrical housing member 15 and semi-cylindrical throughbores 28 and 30 now form a single throughbore the diameter of which is dimensioned to fit a standardized home water pipe such as a shower pipe or a sink water tap. In forming cylindrical housing member 15, permanent magnets 32 in semi-cylindrical half 12 and semi-cylindrical half 14 are now in alignment and the ends of permanent magnet 32 in semi-cylindrical half 12 are in communication with the ends of permanent magnets 32 and semi-cylindrical half 14 as illustrated in FIG. 3.

In one embodiment of magnetic inductor 10, semi-cylindrical halves 12 and 14 would be hingeably secured along one edge of semi-cylindrically surfaces 24 and 26 respectively with a hinge member 34. The opposite edge of semi-cylindrical surfaces 24 and 26 respectively would be secured by a suitable fastening means. In the embodiment illustrated in FIGS. 1 and 2, the fastening means is a hook and loop fastener 36, however, any suitable fastening means would be appropriate. Still further, hinge 34 may be eliminated and the semi-cylindrical half 12 and semi-cylindrical half 14 secured by a fastener such as a hook and loop fastener 36 which circumscribes the entire outer surface as 24 and 26 of semi-cylindrical body members 12 and 14 respectively.

Figure 4:
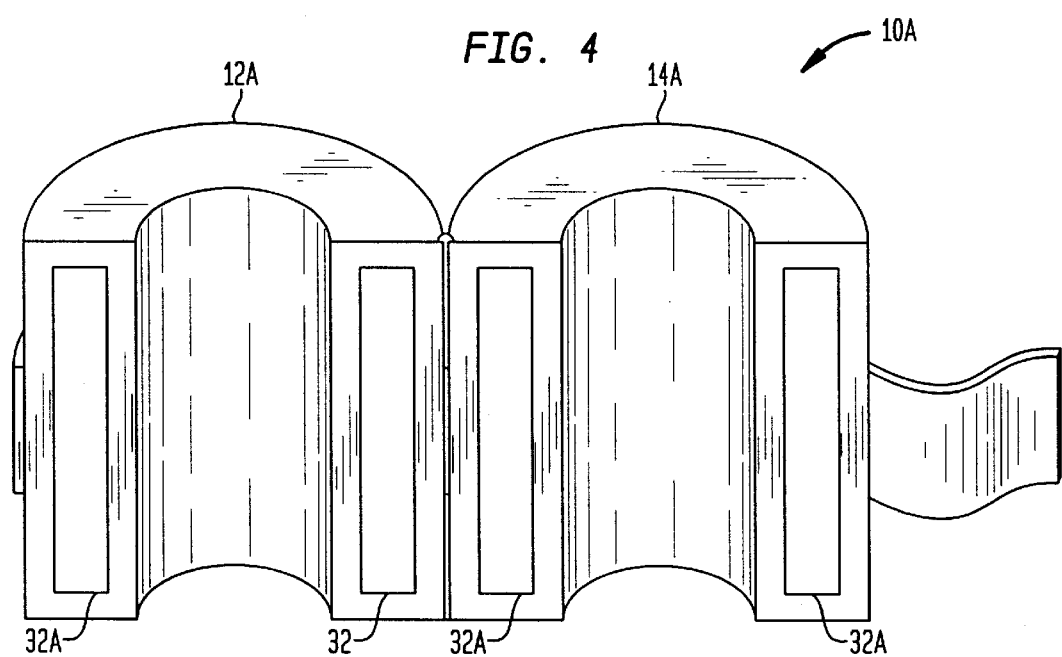
FIG. 4 is an open perspective view of a second embodiment of the magnetic inductor.

While FIG. 1 illustrates a magnetic inductor 10 having a plurality of permanent magnets 32 encased in semi-cylindrical halves 12 and 14, the same result may be achieved with a magnetic inductor 10A as illustrated in FIG. 4 where a single permanent magnet 32A is encased in semi-cylindrical half 12A and semi-cylindrical half 14A. In this embodiment, permanent magnet 32A is semi-cylindrically shaped in a reduced size of semi-cylindrical half 12 and semi-cylindrical half 14. In all other respects, the magnetic inductor 10A would function and be secured in a manner similar to the magnetic inductor 10 of FIGS. 1, 2 and 3.

Figure 5:
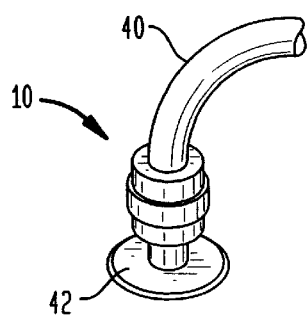
FIG. 5 is a perspective view of a magnetic inductor of the present invention secured to a shower head.

FIG. 5 is a partial prospective view illustrating the magnetic inductor 10 secured about a water pipe 40 which terminates in a shower head 42. Magnetic inductor 10 in its open position is simply positioned such that water pipe 40 is alignably positioned within the throughbore formed by semi-cylindrical channels 28 and 30 respectively and the fastening or securing means 36 being secured about the outer surface 24 and 26 respectively of semi-cylindrical housing members 12 and 14. By so positioning magnetic inductor 10, the benefits of the magnetic fields generated by permanent magnets 32 is imparted to the water passing through the water pipe 40 prior to its exit in shower head 42.

Figure 6:
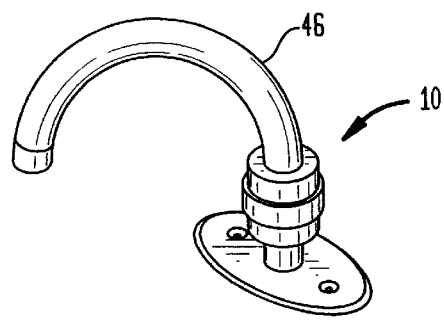
FIG. 6 is a perspective view of a magnetic inductor of the present invention secured to a water tap.

FIG. 6 is a prospective view of the magnetic inductor 10 secured to a spigot 46 of a standard sink. The installation of magnetic inductor 10 in FIG. 6 is identical to that of FIG. 5 and the benefits of the magnetic fields generated by permanent magnets 32 is imparted to the water passing through spigot 44 prior to its exit into a drinking glass or other vessel.

While FIGS. 5 and 6 have been explained with reference to magnetic inductor 10, the first embodiment of the present invention, it will be recognized that magnetic inductor 10A of FIG. 4 may also be so positioned with respect to the water pipe or spigot.

The present invention has been described with respect to the exemplary embodiments thereof and will be recognized by those of ordinary skill in the art that many modifications can be made without departing from the spirit and scope of the invention. Therefore it is manifestly intended that the invention be limited only by the scope of the claims and equivalence thereof.

I claim:

1. A magnetic inductor for imparting an electromagnetic field to water passing through a water conduit, said magnetic inductor comprising:

a cylindrical housing comprised of a first semi-cylindrical member and a second semi-cylindrical member, said first and second semi-cylindrical member formed of a thermoset elastomer, each of said first and second semi-cylindrical members defined by a semi-cylindrical side wall and a side wall having an axial channel formed between two single co-planar surfaces, said axial channels defining a throughbore when said planar surfaces of said first and second semi-cylindrical members are juxtaposed to form said cylindrical housing, said throughbore for receipt therethrough of a water conduit;

a plurality of semi-annular permanent magnets encapsulated in said thermoset elastomer of said first and second semi-cylindrical members, with the exception of the ends thereof, the ends of said semi-annular permanent magnets being co-planar with said planar surfaces of said first and second semi-cylindrical members, said plurality of semi-annular permanent magnets defining an annular ring magnet when said planar surfaces of said first and second semi-cylindrical members are juxtaposed to form said cylindrical housing;

means for securing said first and second semi-cylindrical members in juxtaposed relationship to form said housing about said water conduit.

2. The magnetic inductor in accordance with claim 1 wherein the ends of said semi-annular permanent magnets positioned in said first semi-cylindrical member are in contact relationship with the ends of said semi-annular permanent magnets positioned in said second semi-cylindrical member.

3. The magnetic inductor in accordance with claim 1 wherein said means for securing said housing comprises a hinge member affixed to adjacent longitudinal edges of said semi-cylindrical side wall of said first semi-cylindrical member and said second semi-cylindrical member and a securing means affixed to said opposing adjacent longitudinal edges of said semi-cylindrical side wall of said first and second semi-cylindrical members.

4. The magnetic inductor in accordance with claim 3 wherein said means for securing said first and second semi-cylindrical members to form said housing comprises a hook and loop fastener circumscribing the circumference of said housing.

* * * * *